H. AUSTIN.
TOOL FOR TRUING ENGINE BEARINGS AND THE LIKE.
APPLICATION FILED DEC. 14, 1912.

1,094,187.

Patented Apr. 21, 1914.

Witnesses:
Agnes L. Clune

Inventor:
Herbert Austin
By Edmond Conger Brown
Attorney.

COLUMBIA PLANOGRAPH CO., WASHINGTON, D. C.

UNITED STATES PATENT OFFICE.

HERBERT AUSTIN, OF BROMSGROVE, ENGLAND.

TOOL FOR TRUING ENGINE-BEARINGS AND THE LIKE.

1,094,187.  Specification of Letters Patent. Patented Apr. 21, 1914.

Application filed December 14, 1912. Serial No. 736,866.

*To all whom it may concern:*

Be it known that I, HERBERT AUSTIN, a subject of the King of Great Britain, and residing at Bromsgrove, in the county of Worcester, England, engineer, have invented a certain new and useful tool for truing engine-bearings and the like, and, if required, for use in rounding over the corners of the openings through such blocks or carriages or for use for the like purpose or purposes in analogous cases, of which the following is a specification.

The main object of this invention is to produce a tool for use in simultaneously facing up the sides of a set of bearing blocks or carriages of an internal combustion engine casing, which carry the crank shaft, and, if desired, for use in rounding over the angles which such faces make with the openings through the blocks or carriages; but it will be obvious, after perusing the description of the invention as so applied, that it is applicable also for simultaneously truing up the side faces of a set of bearing blocks or carriages, and, if desired, rounding over the angles of the openings therethrough, in analogous cases.

Figure 1:
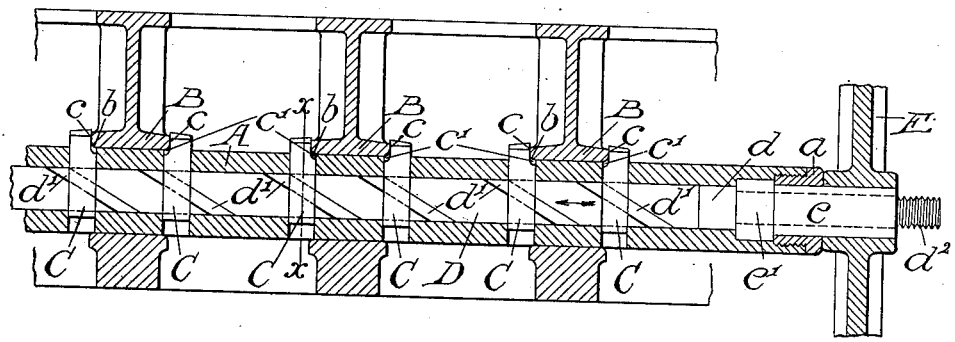
Figure 2:
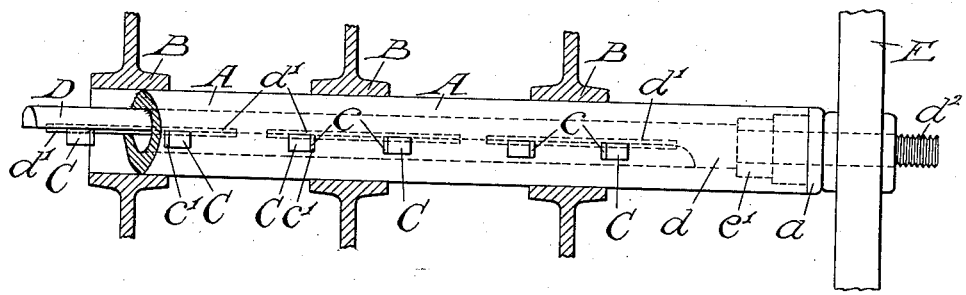
Figure 3:
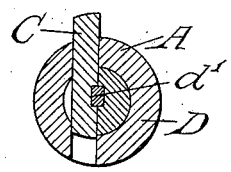

In the acompanying drawings, Figure 1 is a longitudinal section through the bar which carries the cutters, and is shown in position passing through three bearing blocks for the crank shaft of an internal combustion engine. Fig. 2 is a plan view of the bar showing the bearing blocks in section; and, Fig. 3 is a transverse section, to an enlarged scale, taken on line $x\ x$ of Fig. 1. In Figs. 1 and 2, the bar and rod are shown as broken off at one end, for convenience of illustration.

A is the hollow cylindrical bar, which is of a diameter to be just a turning fit within the openings through the bearing blocks B which are to be faced up.

C C, etc., are the cutters, which, as shown, are mainly of a rectangular shape in cross section and are fitted within holes of corresponding shape which are formed through the bar A.

D is the rod which passes endwise inside the hollow of the bar A. The rod D is fitted to be slidable endwise within the bar A, and is conveniently semi-circular in cross section and of a size to fit within one half of the hollow of the bar A, but is preferably formed with one end $d$ of circular shape, which fits slidably within the hollow of the bar A, and the bar may be formed of circular shape at the other end also, if desired. The cutters are fitted within the bar A so that their forward faces fit slidably against the flat face of the rod D, and from this face of the rod D project a number of inclined keys $d'$ which pass through correspondingly - inclined notches or key-grooves formed in the faces of the cutters C. Each cutter is formed with a cutting edge $c$ for truing up one side face of a block B, and (if, as is assumed in the present instance, it is required to round off the angle which such face makes with the opening through the block) with a curved cutting edge $c'$ which enters somewhat within the opening through the block.

In the relative positions in which the parts are shown by Fig. 1, the cutters C have just completed the facing up of the opposite sides of the bearing blocks B, and the rounding over of the angles $b$ which such faces make with the openings through the blocks. It will be seen that if the parts are in their relative positions shown by Fig. 1, and the rod D is moved in the direction of the arrow marked thereon, the inclined keys $d'$, moving through the corresponding notches of the cutters, will draw the cutters inward, and if such endwise movement of the rod D is continued sufficiently, will draw the outer ends of the cutters completely into the bar A without causing their rear ends to project from the bar, and that then the bar can be removed and placed within a fresh set of bearing blocks. When it has been placed within a fresh set of such blocks, the cutters are gradually moved out to face up the opposite sides of the blocks, and finally to round over the corners $b$, by moving the bar in the opposite direction to that indicated by the arrow.

The rod D may be moved endwise in any suitable manner. According to convenient means for this purpose, a wheel E (which may either be a hand-wheel, or a toothed wheel which is mechanically driven so as to insure an automatic feed of the cutters) is fixed upon a sleeve $e$ through which a screwed portion of reduced diameter $d^2$ of the rod D is screwed, and the sleeve $e$ has a collar $e'$ at the inner end thereof which is held between a shoulder of the interior of the bar A and a gland $a$ which is screwed into the end of such bar, whereby the sleeve $e$ is prevented from moving endwise, and therefore, as it is turned through the medium of the wheel E, causes the rod D to move endwise in one direction or the other, according to the direction in which the wheel E is turned. To insure, when the cutters are used also to round off the angles $b$, that they cannot be moved out too far, the parts are arranged so that the round end $d$ of the rod D will, as shown, come against the collar $e'$, simultaneously with the cutters completing their operation, and stop the bar from being moved farther in the opposite direction to that indicated by the arrow.

The cutters may each be formed to cut when either end is moved out from the bar, in which case a rough cut may be made by moving the cutters out in one direction and a smooth cut by moving them out in the opposite direction and the angles might be rounded over by the cutters either at a single operation or roughly when the cutters are moved in one direction and finished when the cutters are moved in the opposite direction; or each cutter may be formed to cut sidewise when moved out in one direction and to round over an angle when moved sufficiently in the opposite direction.

It will now be readily seen that the tool above described is not limited simply to its use in connection with the bearing blocks or carriages of an internal combustion engine case but is applicable also for analogous purposes where like operation is required under similar conditions.

Having fully described my invention, what I claim and desire to secure by Letters Patent, is:—

1. A tool for use in simultaneously facing up the sides of a set of bearing blocks which are rigid with one another, which comprises a hollow cylindrical bar, a plurality of cutters fitted within and slidable transversely of the bar and of a length which permits them to be retracted entirely within the bar, a rod slidably fitted within the bar, and inclined keys and notches by which the rod and cutters are engaged with one another and insure that as the rod is moved endwise the cutters will be moved transversely of the bar.

2. A tool for use in simultaneously facing up the sides of a set of bearing blocks which are rigid with one another, which comprises a hollow cylindrical bar, a plurality of cutters, which are adapted to face up the sides of a set of bearing blocks and subsequently round off the angles which the side faces of the blocks make with the openings therethrough, fitted within and slidable transversely of the bar and of a length which permits them to be retracted entirely within the bar, a rod slidably fitted within the bar and inclined keys and notches by which the rod and cutters are engaged with one another and insure that as the rod is moved endwise the cutters will be moved transversely of the bar.

In witness whereof I have hereunto signed my name this 2nd day of December, 1912, in the presence of two subscribing witnesses.

HERBERT AUSTIN.

Witnesses:
STEPHEN WATKINS,
ETHEL M. WEBB.